(12) United States Patent
Baumas et al.

(10) Patent No.: US 8,047,793 B2
(45) Date of Patent: Nov. 1, 2011

(54) METAL IMPELLER BLADE MANUFACTURED BY MOLDING AND METHOD OF MANUFACTURING THE IMPELLER BLADE

(75) Inventors: Olivier Jean Daniel Baumas, Vert Saint Denis (FR); Lucie Marie Ida Lanciaux, Paris (FR)

(73) Assignee: SNECMA, Paris (FR)

( * ) Notice: Subject to any disclaimer, the term of this patent is extended or adjusted under 35 U.S.C. 154(b) by 577 days.

(21) Appl. No.: 12/269,404

(22) Filed: Nov. 12, 2008

(65) Prior Publication Data
US 2009/0123288 A1   May 14, 2009

(30) Foreign Application Priority Data
Nov. 12, 2007 (FR) ...................................... 07 07924

(51) Int. Cl.
*F01D 5/30* (2006.01)
(52) U.S. Cl. .................................... 416/191; 416/219 R

(58) Field of Classification Search .................. 416/191, 416/189, 219 R
See application file for complete search history.

(56) References Cited

U.S. PATENT DOCUMENTS

| 6,364,001 B1 | 4/2002 | Cross |
| 6,491,498 B1 | 12/2002 | Seleski et al. |
| 7,762,779 B2 * | 7/2010 | Zemitis et al. ................ 416/191 |

FOREIGN PATENT DOCUMENTS

| EP | 1 559 871 A2 | 8/2005 |
| FR | 2 890 878 A1 | 3/2007 |

* cited by examiner

*Primary Examiner* — Stephen Jones
(74) *Attorney, Agent, or Firm* — Oblon, Spivak, McClelland, Maier & Neustadt, L.L.P.

(57) ABSTRACT

The present invention relates to an impeller blade for turbomachine formed by molding, comprising a blade, at one end of which is provided a heel formed of a single piece with the blade, to which it is joined at the level of a connection area, the heel comprising a platform on which is provided at least one sealing plate, a first bath being provided in the platform, characterized in that a second bath is provided in the first bath, at the level of the connection area between the blade and the heel.

6 Claims, 1 Drawing Sheet

METAL IMPELLER BLADE MANUFACTURED BY MOLDING AND METHOD OF MANUFACTURING THE IMPELLER BLADE

The invention relates to a metal impeller blade manufactured by molding and a method of manufacturing the impeller blade.

BACKGROUND OF THE INVENTION

A turbomachine, for example a jet engine, generally comprises a fan, one or more compressor stages, a combustion chamber, one or more turbine stages and a nozzle. The gases are driven by rotors of the fan, of the compressor and of the turbine, thanks to radial impeller blades fixed to the periphery of the rotors.

The concept of an internal, external, radial, upstream or downstream position or arrangement is defined relative to the main axis of the turbomachine and in the direction of flow of the gases in the latter.

A moving turbine impeller blade comprises a foot, by which it is fixed to the rotor disk, a platform, forming one element of the internal wall delimiting the gas artery, and a blade, which extends globally along a radial axis and is swept by the gases. Depending on the motor and the turbine stage, the blade ends, at its end remote from the foot, in an element transversal to the general (main) axis of the blade, called heel, which forms one element of the external wall delimiting the gas artery.

The external surface of the heel supports one or more radial plates—or tabs—adapted to form, with the facing stator wall, a labyrinth seal, ensuring gas-tightness; to this end, said stator wall is generally formed by a ring made of abradable material, on which the plates rub. The plates comprise an upstream face and a downstream face which extend transversely to the flow of gas.

The impeller blade can be of monoblock construction, the foot, the platform, the blade and the heel being formed of a single piece. The impeller blade is formed by molding, by a so-called "lost wax" method, well known to those skilled in the art. In such a method:
  a model of the impeller blade is previously formed in wax;
  this model is dipped in a slip of refractory ceramic material which, once baked, forms a shell;
  the wax is melted and evacuated, leaving a "shell mold" formed of the ceramic material, and whose internal volume defines the shape of the impeller blade;
  molten metal is introduced into the shell mold, a plurality of shell molds generally being assembled in a cluster with a common supply of metal;
  the shell mold is broken, leaving the metal impeller blade.

The metal supply points of the shell mold generate, on the metal impeller blade formed in the mold, metal pilot points, relatively thick, that must be machined once the impeller blade is formed. The supply is generally at the level of the heel of the impeller blade. The diameter of the supply duct, and consequently of the heel formed, is great, even though this supply is close to the plates of the labyrinth seal, which are of low thickness; there follows, if just one supply is provided, a poor distribution of the metal in the shell mold, leading to problems of porosity of the impeller blade, in particular at the level of its plates.

This problem can be resolved by providing two supply inputs, the diameter of the supply ducts being reduced accordingly. Thus, instead of a high diameter supply, two low diameter supplies, but distant from each other, are provided, which provides for a better distribution of the metal and avoids the problems of porosity.

Nevertheless, it would be desirable to resolve the problems of porosity while keeping a single supply.

SUMMARY OF THE INVENTION

To this end, the invention relates to an impeller blade for turbomachine formed by molding, comprising a blade at one end of which is provided a heel formed of a single piece with the blade, to which it is joined at the level of a connection area, the heel comprising a platform on which is provided at least one sealing plate, a first bath being provided in the platform, wherein a second bath is provided in the first bath, at the level of the connection area between the blade and the heel.

The presence of a bath in the bath, at the level of the connection area between the blade and the heel, makes it possible to avoid too great a thickness allowance in this area, which, when molding the impeller blade, allows a better distribution of the liquid metal in the mold. This better distribution allows the implementation of a molding method with a single supply of metal. The manufacture of the impeller blade with single supply presents the advantage of greater simplicity of the shell mold and therefore, where appropriate, of the cluster of shell molds; the cost of manufacturing impeller blades is thus reduced, whereas their quality is improved.

Moreover, the quantity of material at the level of the heel is optimized, which reduces the weight and the cost of the impeller blade.

Furthermore, the mechanical stresses on the heel and/or on the blade are better optimized and better absorbed by the impeller blade, since the weight is better distributed.

According to one embodiment, the first bath being defined by radial surfaces and a bottom, the second bath is provided in the bottom of the first bath.

According to one embodiment, the second bath is formed, in the main axis of the impeller blade, in line with the connection area between the heel and the blade.

According to one embodiment, the blade being formed by a solid wall and comprising, in the connection area, incurved surfaces, and the second bath comprising incurved radial surfaces and a bottom surface, the incurved radial surfaces of the second bath extend roughly parallel to the incurved surfaces of the blade in the connection area, to provide a substantially constant thickness of the impeller blade in the connection area.

The invention also relates to a turbine comprising at least one impeller blade according to the invention.

The invention also relates to a turbomachine comprising at least one turbine according to the invention.

The invention also relates to a method of manufacturing an impeller blade for turbomachine, comprising steps consisting in:
  forming a model of the impeller blade in wax, comprising a blade, at one end of which is provided a heel formed of a single piece with the blade, to which it is joined at the level of a connection area, the heel comprising a platform on which is provided at least one sealing plate, a first bath being provided in the platform and a second bath being provided in the first bath, at the level of the connection area between the blade and the heel,
  dipping the impeller blade in wax in a slip of refractory material, forming a shell mold of refractory material,
supplying the shell mold with molten metal, via a single supply input,
breaking the shell mold and obtaining the impeller blade.

DESCRIPTION OF THE DRAWINGS

The invention will be better understood from reading the following description of the preferred embodiment of the inventive impeller blade and its method of manufacture, with reference to the appended drawings, in which:

Referring to FIG. 1, the impeller blade 1 of the invention extends overall along a main axis A, which is substantially radial relative to the axis B of the turbomachine that includes the impeller blade. The blade here is a jet engine turbine impeller blade. The impeller blade 1 comprises a foot 2, which extends on the internal side, a platform 3, a blade 4 and a heel 5, which extends on the external side. The heel 5 is connected to the blade 4 by a connection area 15. The foot 2 is intended to be received in a recess of the rotor for its fixing to the latter. The platform 3 extends between the foot 2 and the blade 4 and comprises a surface extending transversely relative to the axis A of the impeller blade 1 to form an element of the wall delimiting the gas artery on its internal side; this internal wall is formed by the set of the platforms 3 of the impeller blades 1 of the turbine stage concerned, which are juxtaposed. The blade 4 extends overall along the main axis A of the impeller blade 1 and presents an aerodynamic form suited to its use, in a manner well known to those skilled in the art. The heel 5 comprises a platform 5a which extends, at the external end of the blade 4, substantially transversely to the main axis A of the impeller blade 1.

Referring to FIGS. 2 and 4, the platform of the heel 5 comprises an upstream edge 6 and a downstream edge 7 oriented transversely relative to the direction of flow of the gases (the flow is generally parallel to the axis B of the jet engine). These two upstream 6 and downstream 7 transversal edges are linked by two lateral edges 8, 9, which have a so-called Z profile; each lateral edge 8, 9 comprises two longitudinal portions (8a, 8b), (9a, 9b), respectively, interlinked by a portion 8', 9', respectively, which is substantially transversal or at least at an angle relative to the direction of flow of the gases. It is along the lateral edges 8, 9 that the heel 5 comes into contact with the heels of the two adjacent impeller blades on the rotor. More specifically, in order to dampen the vibrations to which they are subject in operation, the impeller blades are generally mounted on the disk with a torsional stress about their main axis A. The heels 5 are configured for the impeller blades to be torsionally stressed by bearing with their neighbors along the transversal portions 8', 9' of the lateral edges 8, 9.

Figure 1:
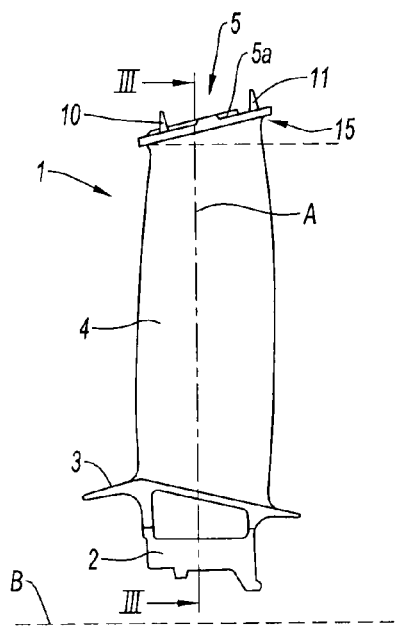
FIG. 1 represents a diagrammatic profile view of a turbine impeller blade according to the invention.

From the external surface of the platform 5a of the heel 5, extend radial sealing plates 10, 11—or tabs 10, 11—in this case two of them; a single plate or more than two plates could be provided. Each plate 10, 11 extends transversally to the axis B of the turbomachine, from the external surface of the platform of the heel 5, between two opposite longitudinal portions (8a, 9a), (8b, 9b) of the lateral edges 8, 9 of the heel 5.

The platform 5a of the heel 5 extends overall with a radial angle α relative to the axis B of the turbomachine. In practice, in the turbine, the section of the gas artery increases from upstream to downstream, to allow the gases to expand; the platform 5a of the heel 5 therefore moves away from the axis B of the turbomachine, from upstream to downstream, its internal surface defining the external limit of the gas artery.

Figure 2:
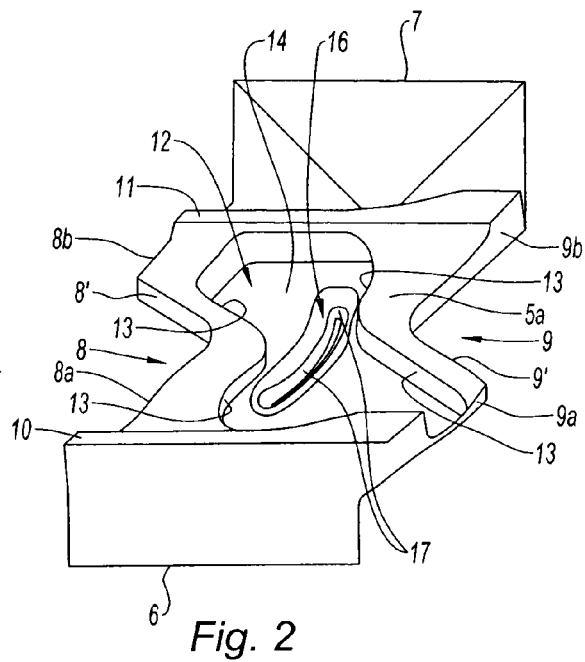
FIG. 2 represents a perspective view from the outside of the heel of the impeller blade, seen from the upstream side.
Figure 4:
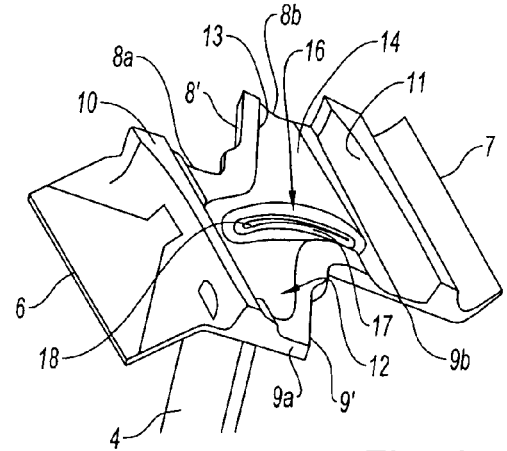
FIG. 4 represents a perspective view from the outside of the heel of the impeller blade, seen in profile.

A first bath 12 is formed (by the shape of the mold) in the platform 5a of the heel 5. This first bath 12 is a cavity formed by shoulder-forming peripheral surfaces 13, which extend from the external surface of the platform 5 and join a surface 14 forming the bottom 14 of the bath 12. The peripheral surfaces 13 extend substantially radially, in this case in an incurved manner on the internal side, to form a connection between the external surface of the platform 5a and the bottom surface 14 of the bath 12. These incurved radial surfaces 13 extend overall parallel to the lateral edges 8, 9 and transversal edges 6, 7 of the platform 5a of the heel 5, whose form they follow seen from above (in the main axis A of the impeller blade 1). Certain areas of the heel 5 need not be provided with such radial surfaces 13, the bottom surface 14 of the bath 12 opening directly onto the lateral edge (see the edge 9a of FIG. 2) (note that, in FIG. 4, these areas are not placed in the same position).

Such a bath 12 was already provided in the impeller blades of the prior art. Its function is to lighten the heel 5 while retaining its mechanical properties: the thickness of the platform 5a of the heel 5 is great close to the lateral edges 8, 9 whose lateral surfaces, in contact with the adjacent impeller blades, are subject to high stresses when the impeller blade 1 rotates, whereas the central part of the platform 5a of the heel 5—subject to lesser stresses—is hollowed out, forming the first bath 12.

The heel 5 also comprises a bath 16 in the first bath 12, that will be named second bath 16. The second bath 16 is formed at the level of the connection area 15 between the heel 5 and the blade 4. More specifically, the second bath is formed, in the main axis A of the impeller blade 1, in line with the connection area 15 between the heel 5 and the blade 4.

The second bath 16 is a cavity formed by shoulder-forming peripheral surfaces 17, which link the bottom surface 14 of the first bath 12 to a bottom-forming surface 18 of the second bath 16 (and located on the internal side relative to the bottom surface 14 of the first bath 12). The peripheral surfaces 17 extend substantially radially, in this case in an incurved manner on the external and internal sides, to form a connection between the bottom surface 14 of the first bath 12 and the bottom surface 18 of the second bath 16. These incurved radial surfaces 17 extend overall parallel to the surfaces of the blade 4, whose form they follow seen from above (in the main axis A of the impeller blade 1) (see FIG. 4).

The second bath 16 is formed on molding (in other words, the form of the shell mold used to form the impeller blade 1 is adapted to form such a bath 16). The impeller blade 1 is formed by a lost-wax molding method, such as that explained in the preamble of the description.

The presence of a second bath 16 makes it possible to avoid having the connection area 15 between the heel 5 and the blade 4 present too great a thickness. Because of this, on introducing the metal into the shell mold, the metal is distributed more evenly, which avoids the appearance of porosities, even if the metal is introduced by a single supply.

Thus, the impeller blade 1 can be formed by a lost-wax molding method with a single liquid metal supply input for each shell mold, which is simpler and therefore less expensive. If the molds are combined in clusters, the latter are even simpler. Furthermore, because of the supply to the shell mold via a single supply input, the manufactured impeller blade comprises only a single residual pilot point to be machined. The machining of such a part is lightened.

Moreover, the weight and therefore the cost of the impeller blade 1 are reduced because of the presence of a second bath 16, whereas the stresses on the heel 5 and the stresses on the blade 4 are better distributed and therefore better supported by the impeller blade 1.

The blade 4 is here formed by a solid wall, that is, it is not cooled by a sleeve or a void provided in the thickness of its wall. The peripheral surfaces 17 and the bottom surface 18 of the second bath 16 are preferably arranged for the thickness of the impeller blade 1 to be substantially constant in the connection area 15 between the heel 5 and the impeller blade 4. This characteristic can be clearly seen in FIG. 3. More specifically, if 15a, 15b are used to denote the incurved surfaces of the blade 4 at the level of the connection area 15 between the blade 4 and the heel 5, it can be seen in FIG. 3 that the incurved radial surfaces 17 of the second bath 16 are configured to extend substantially parallel to the incurved surfaces 15a, 15b of the blade 4 with which they are facing. In the embodiment shown, the radius of the incurved radial surfaces 17 of the second bath 16 is not identical to the radius of the incurved surfaces 15a, 15b of the facing blade 4, but these surfaces are nevertheless substantially parallel.

Figure 3:
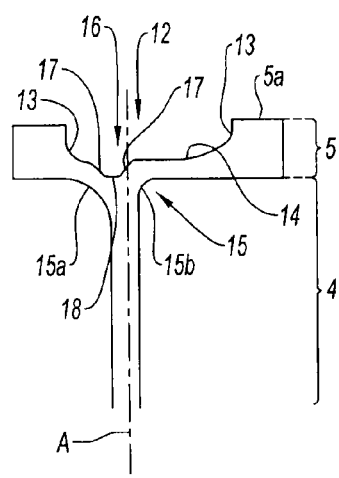
FIG. 3 represents a cross-sectional view of the section of the impeller blade, in the plane III-III indicated in FIG. 1.

It can be seen in the part of the second bath 16 located to the left of FIG. 3 that there is continuity of curvilinear form, with no really flat portion, between the incurved radial surface 13 of the first bath 12, the bottom 14 of the first bath 12 and the incurved radial surface 17 of the second bath 16. On the other hand, on the part of the second bath 16 located to the right of FIG. 3, each of these portions can be very clearly distinguished. The relative arrangement of the different portions obviously depends, in an area (in cross section) considered, on the position of the surfaces of the heel 5 relative to the surfaces of the blade 4.

The invention has been presented with reference to a moving turbine impeller blade. It in fact applies to any impeller blade formed by molding, comprising a blade, at one end of which is provided a heel formed of a single piece with the blade.

What is claimed is:

1. An impeller blade for turbomachine formed by molding, comprising a blade at one end of which is provided a heel formed of a single piece with the blade, to which it is joined at the level of a connection area, the heel comprising a platform on which is provided at least one sealing plate, a first bath being provided in the platform, wherein a second bath is provided in the first bath, at the level of the connection area between the blade and the heel.

2. The impeller blade as claimed in claim 1, wherein, the first bath being defined by radial surfaces and a bottom, the second bath is provided in the bottom of the first bath.

3. The impeller blade as claimed in claim 1, wherein the second bath is formed, in the main axis (A) of the impeller blade, in line with the connection area between the heel and the blade.

4. The impeller blade as claimed in claim 3, wherein, the blade being formed by a solid wall and comprising, in the connection area, incurved surfaces, and the second bath comprising incurved radial surfaces and a bottom surface, the incurved radial surfaces of the second bath extend roughly parallel to the incurved surfaces of the blade in the connection area, to provide a substantially constant thickness of the impeller blade in the connection area.

5. A turbine comprising at least one impeller blade as claimed in claim 1.

6. A turbomachine comprising at least one turbine as claimed in claim 5.

* * * * *